Feb. 10, 1931.　　　H. C. HOLLINGER　　　1,792,165
DRIVE MECHANISM
Filed July 31, 1928　　2 Sheets-Sheet 1
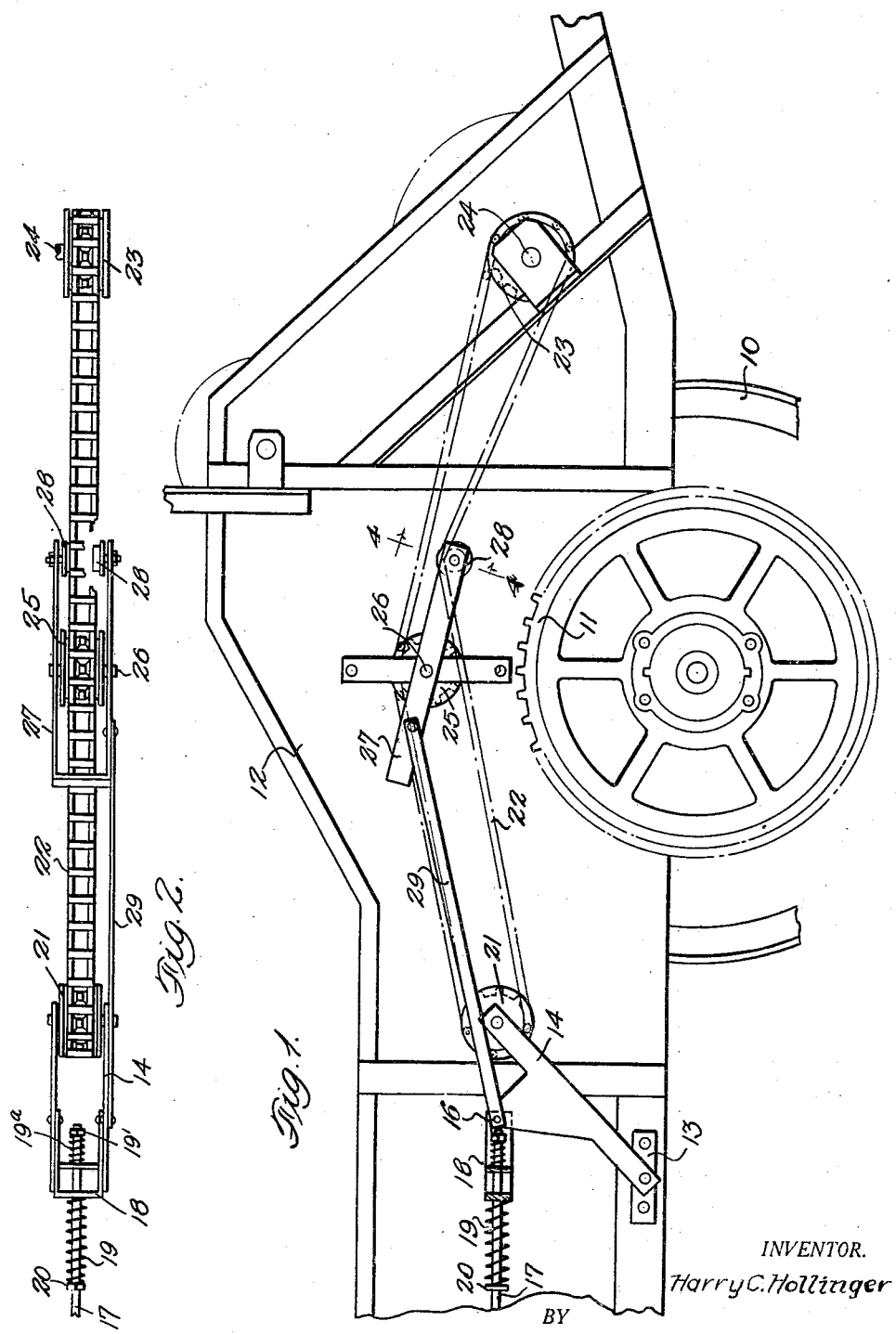

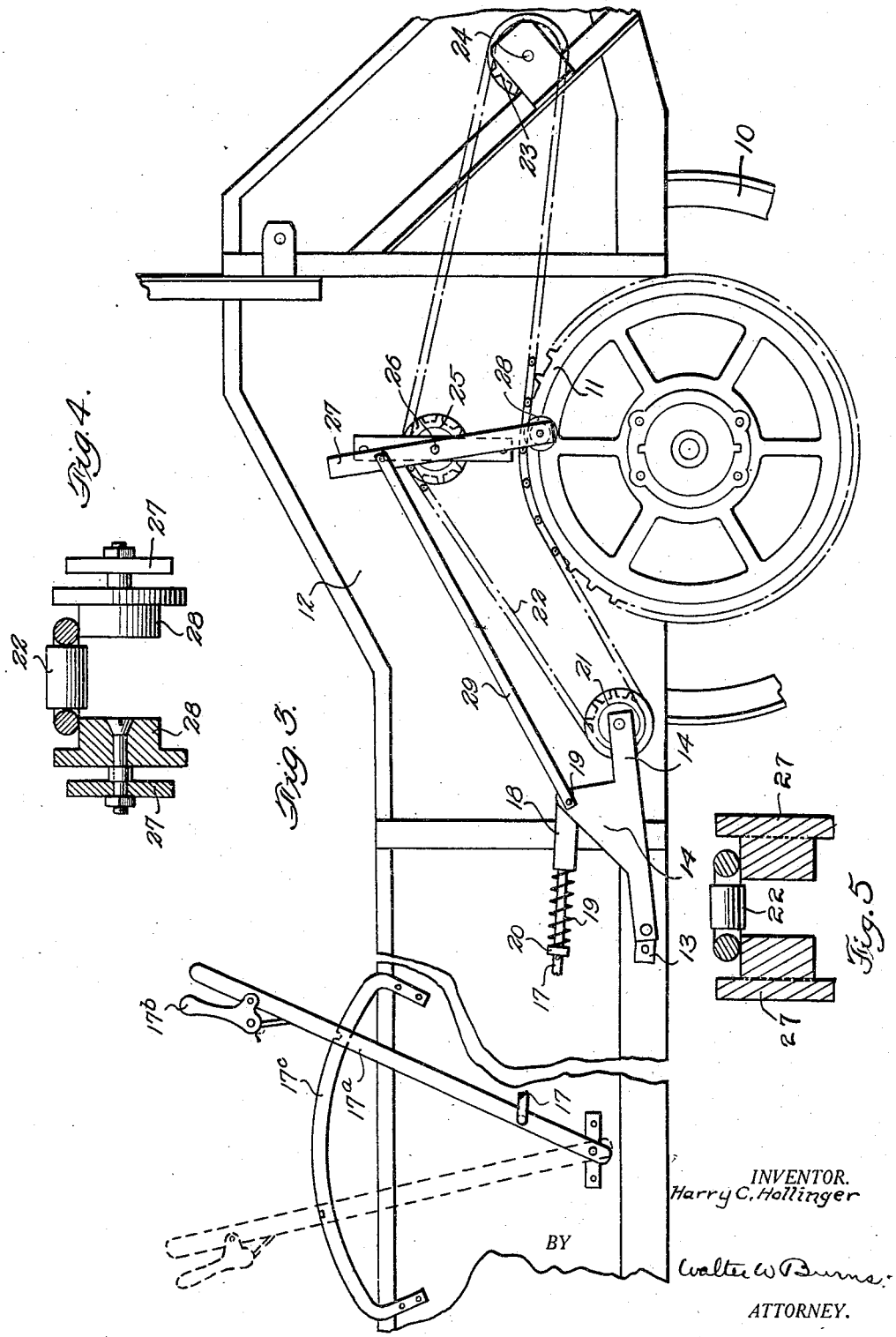

Patented Feb. 10, 1931

1,792,165

UNITED STATES PATENT OFFICE

HARRY C. HOLLINGER, OF YORK, PENNSYLVANIA, ASSIGNOR TO A. B. FARQUHAR CO., LTD., OF YORK, PENNSYLVANIA, A LIMITED PARTNERSHIP OF PENNSYLVANIA

DRIVE MECHANISM

Application filed July 31, 1928. Serial No. 296,456.

This invention relates to drive mechanisms and has particular relation to a mechanism suitable for use on manure spreaders.

Manure spreaders, as customarily constructed, use the rear wheels to drive the discharging and distributing mechanism. It is usual to have a chain which may be raised and lowered onto a drive sprocket connected to the drive wheel. It is to this type of drive mechanism to which this invention is related.

The primary object of this invention is the provision of an improved drive mechanism for manure spreaders and the like.

Another object of this invention is the provision of an improved drive mechanism for manure spreaders which will have a chain and means for lifting the chain from its drive sprocket at points adjacent to and distant from the top of the drive sprocket.

Another object of this invention is the provision of an improved drive mechanism having a sprocket and chain connection and a lifting means for the chain to cause disconnection between the chain and sprocket this means including a chain support which is capable of engaging the chain on each side of the sprocket to lift the same from the sprocket.

Other and further objects of this invention will be apparent to one skilled in the art from a reading of the complete specification and claims.

Referring to the drawing wherein is illustrated an embodiment of this invention, Figure 1 is an elevation view of my invention showing the drive mechanism in inoperative position, Figure 2 is a top fragmental view of the drive mechanism, Figure 3 is a view similar to Figure 1, but showing the parts in their operative positions with the chain and sprocket connected and showing the forward end of a vehicle with drive-control hand lever.

Figure 4 is an enlarged fragmental view on the line 4—4 of Figure 1.

Figure 5 is similar to Fig. 4, but with integral chain lifting lugs.

Similar reference characters refer to the same or similar parts throughout the several views of the drawing.

In the accompanying drawing is illustrated the drive mechanism as applied to a manure spreader. Manure spreaders are mounted upon four wheels, the left rear wheel being shown in the drawing at 10. A large sprocket wheel 11 is mounted to turn with the wheel 10 and provides a power drive connection for the operation of the discharging and distributing mechanism of the manure spreader.

On one side of the body 12 of the manure spreader is mounted a bracket 13 to which is pivoted a swinging double arm 14. The arm 14 carries a pivot 16 to which is pivotally connected a rod 17, by the link 18. The link 18 has a sliding connection with the rod 17. A spring 19 surrounds the rod 17 and rests between the link 18 and the stop 20 on the rod 17. Another spring 19ª also surrounds the rod 17 and rests between the link 18 and the nut 19′ at the end of the rod 17.

At the upper end of the double arm 14 is journaled an idler puller or sprocket 21 which carries a chain 22.

The chain 22 is located in the plane of the sprocket wheel 11 and is located thereabove, to be raised out of engagement from or lowered into engagement with the wheel 11.

The chain 22 extends to a sprocket wheel 23 which is carried by the shaft 24. The shaft 24 drives the discharging and spreading devices of the manure spreader. As these latter form no part of this invention per se, the details of their construction will not be further set forth.

Intermediate the two sprockets 21 and 23, is an idler sprocket or pulley 25 which is mounted on a stub shaft 26 secured to the side 12 of the body of the manure spreader. The idler pulley or sprocket 25 carries the upper reach of the chain 22. The lower reach is carried by two guides at the ends of the inverted U-shaped member 27. These guides are in the form of small lugs or rollers 28 and are placed on the inside of each side of the inverted U-shaped member 27. The two sides of the inverted U-shaped member 27 are of a distance apart to freely permit of the passage of the chain 22 therebetween.

The insides of the lugs or rollers 28 are of such a distance apart that there is sufficient room for the lugs to pass down over the sprocket wheel 11, but there is not sufficient space for the passage of the chain. In other words, the chain is free to move between the sides of the inverted U-shaped member 27 and may be deposited for operation on the sprocket 11, but cannot be accidentally removed from the inverted U-shaped member.

The U-shaped member 27 is pivoted on the stub shaft 26, its sides being on opposite sides of the idler sprocket or pulley 25.

The stub shaft 26 which serves as a pivot for the inverted U-shaped member, is placed a sufficient distance above the sprocket wheel 11 to permit the chain 22 to be held clear of the sprocket wheel 11 when a drive connection between the chain 22 and the wheel 11 is not desired. However, the pivot 26 is close enough to the sprocket 11 so that when the inverted U-shaped member 27 is swung to a nearly vertical position, the sides of the U-shaped member straddle the sprocket 11, permitting the chain to drop over the teeth of the sprocket, thus establishing a driving connection between the chain and sprocket.

A rod 29 extends from a point near the top of the U-shaped member 27 to the pivot 16 on the swinging arm 14. This rod 29 serves to swing the inverted U-shaped member 27 from a vertical position (Fig. 3) when the arm 14 is down, to an inclined position when the arm 14 is raised. When the arm 14 is swung downwardly and the inverted U-shaped member is in vertical position, it will be observed that the chain 22 and the sprocket wheel 11 form an operative drive connection for the shaft 24.

In operation, the rod 17 is operated by means of a hand lever 17a which may be held in any desired adjusted position by means of a suitable detent operated by the handle 17b. This detent engages suitable notches in the rack 17c.

When compression is placed in the rod 17, the arm 14 is swung in a clockwise direction as seen in Fig. 1. It will be noted that this lowers the forward portion of the chain 22. But this movement of the arm 14 also places compression in the link 29 and causes the inverted U-shaped arm 27 to assume a vertical position and deposit the chain 22 on the sprocket wheel 11.

As the downward movement of the arm 14 is continued more of the chain 22 is brought into a position to engage the sprocket wheel 11. The movement of the sprocket wheel 11 in a counter-clockwise direction, as seen in Fig. 1, causes the driving of the chain 22 and consequent driving of the sprocket wheel 23 and the shaft 24, to drive the discharge mechanism.

When the chain is lowered to engage sprocket 11, if it should happen that the sprocket 11 was stopped in such a position that the chain would strike the top of the teeth when lowering, the spring 19 enables the operator to draw the lever into the notch and the instant the spreader is moved the chain will drop on to the sprocket in its proper operative position.

When it is desired to disconnect the chain 22 from the sprocket 11, it is only necessary to operate the hand lever which controls the rod 17, to place tension in the latter. This action swings the arm 14 in a counter-clockwise direction toward the position shown in Fig. 1, at the same time swinging the inverted U-shaped member 27, causing the rollers or lugs 28 to lift the chain 22 away from the sprocket wheel 11. The manure spreader or other vehicle may now be moved over the ground without operating the discharging mechanism or any of its coacting parts.

Occasionally the operator will desire to lift the chain while the load between the sprocket 11 and the chain 22 will be great enough to prevent the chain from lifting. The spring 19a enables the operator to draw the operating lever 17a to the proper notch in the quadrant 17c when in this condition, the instant the spreader moves, the chain 22 will immediately lift clear of the sprocket 11.

While I have illustrated and described in detail one embodiment of my invention I desire to have it understood that I do not limit myself to the exact showing and that modifications, variations and changes may be made without departing from the spirit of my invention and within the scope of the appended claims.

Having described my invention, what I claim and desire to secure by Letters Patent is:—

1. In a manure spreader, a drive wheel, a sprocket wheel connected to the drive wheel to be driven thereby, a shaft, a sprocket carried by the shaft, an endless chain mounted above the first sprocket and in operative connection with the second sprocket, means movable on opposite sides of the sprocket wheel to, at will, lift the chain out of and place the chain into contact with a segment of the first named sprocket wheel, the movable means coming into or leaving contact with the chain at a point adjacent one end of the segment of the first named sprocket wheel contacted by the chain.

2. In a manure spreader, a drive wheel, a sprocket wheel connected to the drive wheel to be driven thereby, a shaft, a sprocket carried by the shaft, an endless chain mounted above the first sprocket and in operative connection with the second sprocket, means pivoted above the first sprocket for holding the chain out of engagement with the sprocket in one position and for lowering the chain into engagement with a segment of the sprocket when moved to another position, the means passing along the opposite sides of the first sprocket when in the latter position, the means coming into and out of contact with the chain adjacent one end of that segment of the gear contacted by the chain.

3. In a manure spreader, a drive wheel, a sprocket wheel connected to the drive wheel to be driven thereby, a shaft, a second sprocket carried by the shaft, an endless chain mounted above the first sprocket and in operative connection with the second sprocket, means pivoted above the first sprocket for holding the chain out of engagement with the sprocket in one position and having a member having divided portion mounted for movement to simultaneously place the divided portions on opposite sides of the sprocket and deposit the chain upon a segment of the first sprocket, the divided portions coming into and out of contact with the chain adjacent one end of the segment of the gear contacted by the chain.

4. In a manure spreader, a drive wheel, a sprocket wheel connected to the drive wheel to be driven thereby, a shaft, a sprocket carried by the shaft, an endless chain mounted above the first sprocket and in operative connection with the second sprocket, means for supporting the chain in a position above the sprocket, including two pivoted arms on opposite sides of the chain and of sufficient distance apart to permit passage of the chain therebetween and having projections to engage the sides of the chain at the bottom, the projections being of a distance apart to pass on opposite sides of the drive sprocket to deposit the chain on a segement of the periphery thereof, the projections coming into and out of contact with the chain adjacent one end of the segment of the gear contacted by the chain.

5. In a manure spreader, a drive wheel, a sprocket wheel connected to the drive wheel to be driven thereby, a shaft, a sprocket carried by the shaft, an endless chain mounted above the first sprocket in position, when lowered, to engage a segment thereof and in operative connection with the second sprocket, means pivoted above the first named sprocket for supporting the chain in a position above the said sprocket, including an idler wheel, an arm swingingly supporting the idler wheel and a swinging arm for engagement of the chain at points above the drive sprocket and adjacent one end of the segment contact for supporting the chain above the drive sprocket and for depositing the same on the periphery of the drive sprocket when a driving connection is desired.

6. In a manure spreader, a drive wheel, a sprocket wheel connected to the drive wheel to be driven thereby, a shaft, a sprocket carried by the shaft, an endless chain mounted above the first sprocket in position when lowered to engage a segment thereof and in operative connection with the second sprocket, an idler gear in operative relation to the endless chain, means for raising and lowering the idler and separate means located directly over the drive sprocket for raising and lowering the chain over the top of the first named sprocket, and for causing simultaneous movement of the idler raising and lowering means, the separate means contacting with the chain to lift it from the sprocket, adjacent one end of the segment of contact.

7. In a manure spreader, a drive wheel, a sprocket wheel connected to the drive wheel to be driven thereby, a shaft, a sprocket carried by the shaft, an endless chain mounted above the first sprocket in position when lowered to engage a segment thereof and in operative connection with the second sprocket, an idler gear in operative relation to the endless chain, means for raising and lowering the idler, a swinging inverted U-shaped member, pivoted in a position over the drive sprocket, projections on the inner face of each side of the inverted U-shaped member for engagement with the bottom of the chain and adjacent one end of the segment of engagement, the adjacent sides of the projections being of a sufficient distance apart to clear the sides of the sprocket wheel when the chain is lowered thereon, but close enough together to lift the chain, whenever the U-shaped member swings on its pivot to lift the chain and means for simultaneously causing the idler raising and lowering means and the inverted U-shaped member to be operated to cause the lifting or lowering of the portion of the chain over the drive sprocket and the portion of the chain on the idler to be raised or lowered at the same time.

8. In a manure spreader, a drive wheel, a sprocket wheel connected to the drive wheel to be driven thereby, a shaft, a sprocket carried by the shaft, an endless chain mounted above the first sprocket in position when lowered to engage a segment thereof and in operative connection with the second sprocket, a swinging arm, an idler on the arm at the outer end and rod means for determining the position of the idler carrying arm, an idler over the drive sprocket for carrying the upper reach of the chain, a swinging pivoted inverted U-shaped member in position to straddle the sides of the drive sprocket when in one position, means at the end of the inverted U-shaped member to engage the chain adjacent one end of the segment of engagement and support the chain over the drive sprocket and to, at will, place the chain in coaction or out of coaction with the drive sprocket and a link connecting the idler carrying arm with the inverted U-shaped member to cause their simultaneous operation.

9. In a manure spreader, a drive wheel, a sprocket wheel connected to the drive wheel to be driven thereby, a shaft, a sprocket carried by the shaft, an endless chain mounted above the first sprocket in position when lowered to engage a segment thereof and in operative connection with the second sprocket, a swinging arm, an idler on the arm at the outer end and rod means for determining the position of the idler carrying arm, an idler over the drive sprocket for carrying the upper reach of the chain, a swinging pivoted inverted U-shaped member in position to straddle the sides of the drive sprocket when in vertical position, means at the end of the inverted U-shaped member to support the chain over the drive sprocket and to, at will, place the chain in coaction or out of coaction with the drive sprocket and a link connecting the idler carrying arm with the inverted U-shaped member to cause their simultaneous operation, the means at the end of the inverted U-shaped member coming into and out of contact with the chain adjacent one end of the segment of the gear contacted by the chain.

10. In a manure spreader, a drive wheel, a sprocket wheel connected to the drive wheel to be driven thereby, a shaft, a sprocket carried by the shaft, an endless chain mounted above the first sprocket and in operative connection with the second sprocket, means straddling the chain and engaging opposite sides thereof for raising and lowering the chain from and onto the sprocket and yielding means to permit operation of the raising and lowering means whether or not the links of the chain register with the teeth of the sprocket and for bringing about proper registration when the vehicle is moved.

11. In a manure spreader, a drive wheel, a sprocket wheel connected to the drive wheel to be driven thereby, a shaft, a sprocket carried by the shaft, an endless chain mounted above the first sprocket and in operative connection with the second sprocket, means straddling the chain and engaging opposite sides thereof for raising and lowering the chain from and onto the sprocket and yielding means to permit operation of the raising and lowering means in the disengaging operation, whether or not the links are prevented by the load from separation from the sprocket teeth and for bringing about the separation as soon as the vehicle is moved.

12. In a manure spreader, a drive wheel, a sprocket wheel connected to the drive wheel to be driven thereby, a shaft, a sprocket carried by the shaft, an endless chain mounted above the first sprocket and in operative connection with the second sprocket, means straddling the chain and engaging opposite sides thereof for raising and lowering the chain from and onto the sprocket and yielding means for permitting operation of the raising and lowering means whether or not the links of the chain register with the teeth of the sprocket during the lowering of the chain to operative position or whether or not the load between the sprocket and chain prevent disconnection when the chain is raised and for causing complete operative connection or disconnection, as the case may be, when the vehicle is moved.

In testimony whereof I hereunto affix my signature.

HARRY C. HOLLINGER.